United States Patent Office 3,358,048
Patented Dec. 12, 1967

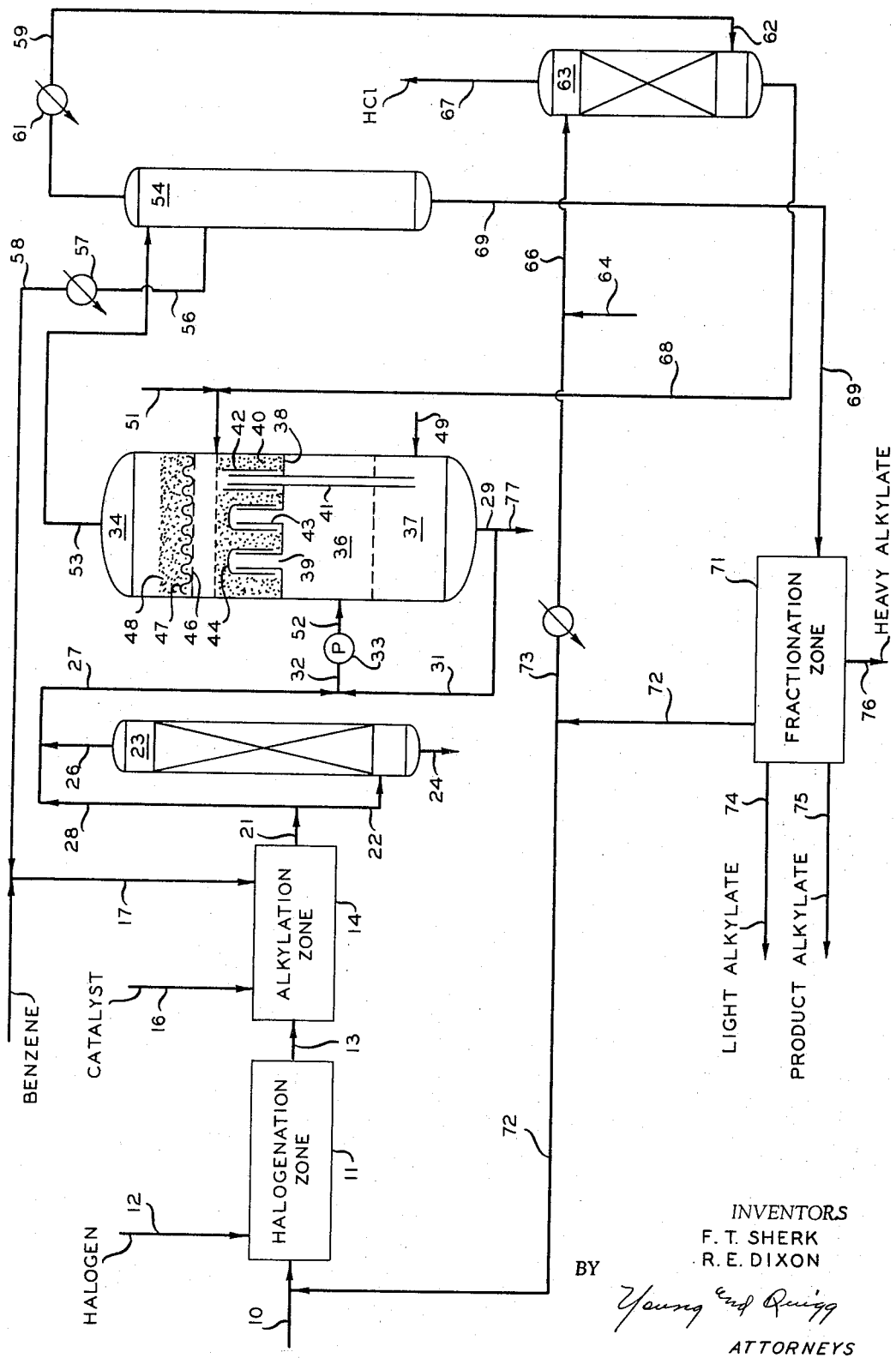

3,358,048
REMOVAL OF ALUMINUM CHLORIDE FROM HYDROCARBONS
Fred T. Sherk and Rolland E. Dixon, Bartlesville, Okla., assignors to Phillips Petroleum Company, a corporation of Delaware
Filed June 26, 1964, Ser. No. 378,258
9 Claims. (Cl. 260—671)

ABSTRACT OF THE DISCLOSURE

Aluminum chloride contained in a hydrocarbon stream is removed therefrom by contacting said stream with an aqueous solution of hydrogen chloride which also contains a minor but effective amount of a mineral acid such as phosphoric acid or sulfuric acid, and then contacting the thus threated hydrocarbon stream with an aqueous solution of hydrogen chloride.

This invention relates to the removal of aluminum chloride from hydrocarbon streams. In one aspect this invention relates to a method for removing aluminum chloride catalyst from hydrocarbon stream effluents from hydrocarbon conversion zones wherein conversion of hydrocarbons is effected in the presence of aluminum chloride catalyst. In another aspect this invention relates to a combination of apparatus for removing aluminum chloride from said hydrocarbon streams.

Aluminum chloride has long been used in numerous processes for the conversion of hydrocarbons, including the decomposition or cracking of high-boiling hydrocarbons, isomerization of low-boiling hydrocarbons, polymerization of olefins, and alkylation of alkylatable hydrocarbons. The hydrocarbon effluent obtained from the reaction zone of such processes usually contains a small amount of the aluminum chloride catalyst, sometimes in an amount as small as about 0.01 weight percent. The concentration of aluminum chloride in such hydrocarbon streams will usually be within the range of from about 100 to about 1000 p.p.m. However, the invention is applicable to hydrocarbon streams containing concentrations of aluminum chloride outside this range. Although this amount of aluminum chloride in the hydrocarbon stream may be small, and the aluminum chloride may be completely soluble in the hydrocarbon, the presence thereof in the hydrocarbon stream gives rise to numerous troubles in process equipment. The presence of the aluminum chloride results in serious fouling of heat exchangers, condensers, reboilers and other parts of the equipment used in the process. In addition, corrosion is a serious problem resulting in malfunctioning of valves, pumps, control mechanisms, and the like. A major obstacle is encountered in reaction systems where a clean, representative sample of a hydrocarbon stream must be obtained for analysis in automatic analyzing equipment.

Methods resorted to heretofore to effect the separation of aluminum chloride from hydrocarbon streams include adsorption on surface active media such as bauxite and charcoal, water washing, and flash evaporation. Separation of entrained aluminum chloride catalyst can be achieved to a substantial degree by passage of the hydrocarbon stream through a bed of highly adsorptive material. However, such adsorbents are not very effective in removing aluminum chloride catalyst contaminants dissolved in the hydrocarbon stream. Another disadvantage to the use of adsorbents is that the adsorptive material usually contains a sufficient amount of water to form corrosive hydrogen chloride which can cause serious corrosion problems in the apparatus. Water washing is an effective method for removing aluminum chloride from hydrocarbon streams and is simple in principle. However, complicated mechanical equipment is required since the water hydrolyzes the aluminum chloride and forms corrosive hydrogen chloride. Also, where the hydrocarbon stream is to be analyzed for hydrogen chloride content, water washing cannot be used to remove the aluminum chloride since the hydrogen chloride content will be changed in the water washing process. Flash evaporation of the sample stream is an effective method for removing aluminum chloride from hydrocarbon streams provided the ratio of heavy to light hydrocarbons is constant and provided the flash temperature can be maintained low enough to minimize the carryover of aluminum chloride. The temperature and pressure of flashing are very critical so that this method of removing aluminum chloride is difficult to control.

In copending application Ser. No. 378,257, filed June 26, 1964, filed by M. V. De Lano, Jr., there is disclosed and claimed a process and apparatus for removing aluminum chloride from hydrocarbon streams containing the same. Broadly speaking, the process of said copending application comprises contacting the hydrocarbon stream containing aluminum chloride with a concentrated aqueous solution of hydrogen chloride whereby a precipitate of aluminum chloride forms in said hydrogen chloride solution; separating said precipitated aluminum chloride from said hydrogen chloride solution; and returning said precipitate-free hydrogen chloride solution to said contacting step. In said process any suitable method and means for effecting said contacting, e.g., countercurrent contacting, mixing tanks, etc., can be employed. Also, any suitable means for effecting separation of said precipitate from the concentrated aqueous hydrogen chloride solution, e.g., filtration, settling, centrifuging, etc., can be employed.

The process of said copending application represents a marked advance in the art because it avoids the above-described difficulties. However, in the practice of said process it is necessary to handle a solid, i.e., the precipitate of aluminum chloride which forms in the concentrated aqueous hydrogen chloride solution. In some instances this has disadvantages.

We have now discovered that the formation of said aluminum chloride precipitate can be avoided and an all liquid process provided by contacting the hydrocarbon stream containing aluminum chloride with an aqueous solution of hydrogen chloride which also contains a minor amount of a mineral acid, such as phosphoric acid or sulfuric acid, which is sufficient to maintain said precipitate in solution. After contacting said hydrocarbon stream with said aqueous hydrogen chloride-mineral acid solution, it is desirable to wash or contact the treated hydrocarbon stream to remove traces of the mineral acid therefrom. We have further discovered that said mineral acids can be removed from said treated hydrocarbon stream by washing or contacting same with an aqueous solution of hydrogen chloride. The present invention is thus an improvement over the invention of said copending application.

Thus, broadly speaking, the present invention resides in removing aluminum chloride contained in a hydrocarbon stream by contacting said stream with an aqueous solution of hydrogen chloride which also contains a minor but effective amount of a mineral acid such as phosphoric acid or sulfuric acid, and then contacting the thus treated hydrocarbon stream with an aqueous solution of hydrogen chloride; and an apparatus for carrying out said removal of aluminum chloride from said hydrocarbon stream.

An object of this invention is to provide a convenient, economical and highly satisfactory method for purifying a hydrocarbon stream effluent from a hydrocarbon conversion carried out in the presence of aluminum chloride catalyst. Another object of this invention is to provide a method for removing aluminum chloride catalyst from a hydrocarbon stream effluent obtained from a hydrocarbon conversion carried out in the presence of said catalyst without substantially altering the composition of said effluent. Another object of this invention is to provide a method for removing aluminum chloride catalyst from a hydrocarbon stream effluent from a hydrocarbon conversion process carried out in the presence of said catalyst and promoted with hydrogen chloride without substantially altering the composition of said effluent and without removing hydrogen chloride contained in said effluent. Another object of this invention is to provide a method for removing aluminum chloride from hydrocarbon streams to reduce corrosion and clogging of processing equipment employed in processing said streams. Still another object of this invention is to provide a method of recovering hydrogen chloride produced in hydrocarbon conversion processes carried out in the presence of aluminum chloride catalyst. Still another object of this invention is to provide an apparatus which can be employed in carrying out the above-described methods. Other aspects, objects, and advantages of the invention will be apparent to those skilled in the art in view of this disclosure.

Thus, according to the invention, there is provided a process for removing aluminum chloride from a hydrocarbon stream containing the same, which process comprises the steps of: contacting said stream with an aqueous solution of hydrogen chloride which also contains a minor but effective amount of a mineral acid sufficient to prevent the formation of a precipitate of aluminum chloride in said solution, said mineral acid being selected from the group consisting of phosphoric acid, sulfuric acid, and mixtures thereof; and then contacting said thus treated hydrocarbon stream with an aqueous solution of hydrogen chloride.

Further according to the invention, there is provided an apparatus for removing aluminum chloride from a hydrocarbon stream containing the same, said apparatus comprising a treating tower for effecting said two-stage treatment discussed in the immediately preceding paragraph.

An important advantage of the invention is that aluminum chloride can be removed from hydrocarbon streams without concomitantly removing dissolved hydrogen chloride which may be present in said streams. Hydrogen chloride is a relatively expensive chemical and the provision of same as a promoter in hydrocarbon conversion processes catalyzed by aluminum chloride catalyst is a major expense item of such processes. This advantage of the invention is particularly important in those conversion processes where hydrogen chloride is produced in the conversion zone, e.g., the alkylation of aromatics with alkyl halides, because said produced hydrogen chloride can be subsequently recovered as a product of the process.

It is well known that aluminum chloride forms a complex or complexes with hydrocarbons and said complex or complexes have catalytic properties. The chemistry of aluminum chloride catalysis of hydrocarbon conversions is not completely understood. It is presently believed by those skilled in the art that aluminum chloride per se and aluminum chloride-hydrocarbon complexes both exert catalytic activities in said conversions. Thus, herein and in the claims, unless otherwise specified, the term "aluminum chloride catalyst" is employed generically to include both aluminum chloride and aluminum chloride-hydrocarbon complexes.

Referring now to the drawing, the invention will be more fully explained. Said drawing is a schematic flow sheet of one type of hydrocarbon conversion process having incorporated therein one embodiment of the present invention. The process illustrated comprises the alkylation of an aromatic hydrocarbon with an alkyl halide to produce a detergent grade alkylate. It will be understood that said drawing is diagrammatic in nature and many valves, pumps, condensers, surge tanks, control instruments, etc., not necessary for explanation of the invention to those skilled in the art, have been omitted. In the process illustrated in said drawing, a suitable hydrocarbon mixture comprising predominantly normal paraffinic and isoparaffinic hydrocarbons of suitable boiling range, such as a $C_{10}$ to $C_{15}$ or a $C_{13}$ to $C_{15}$ fraction, is introduced via conduit 10 into photochemical halogenation zone 11 wherein it is contacted in the presence of light with a halogenating agent introduced via conduit 12. Usually the hydrocarbon fraction introduced into halogenation zone 11 will preferably contain a high percentage of normal paraffinic hydrocarbons. Such a fraction can be obtained by contacting kerosene with a suitable molecular sieve. However, it is within the scope of the invention to utilize mixtures of hydrocarbons which comprise predominantly branched chain paraffin hydrocarbons. If desired, the hydrocarbon introduced via conduit 10 can be a pure or essentially pure paraffinic hydrocarbon.

Chlorine is the presently most preferred halogenating agent. Any suitable halogenation conditions can be employed in said halogenation zone but it is preferred to select conditions which provide about 20 percent conversion of the hydrocarbons to halogenated hydrocarbons per pass. Said conditions will include a temperature within the range of from 0 to 100° F., preferably 20 to 50° F., a pressure within the range of from 20 to 100 p.s.i., preferably 30 to 50 p.s.i., and a reaction time within the range of 8 to 20 seconds. It will be understood that said conditions are interrelated and variation in one condition will be accompanied by variation in one or more of the other conditions. For example, when using the preferred halogenating agent (chlorine), pressure is employed to maintain the hydrocarbon in liquid phase (if necessary) and also to increase the solubility of gaseous chlorine in said hydrocarbons. The amount of pressure actually employed will depend upon the hydrocarbons present, the temperature, and the desired conversion level. With respect to temperature, higher temperatures favor the formation of dichlorides which is undesirable. Higher conversion rates also favor the formation of dichlorides. It is preferred to select conditions such that the ratio of monochlorides to dichlorides is within the range of from 4:1 to 30:1, preferably 7:1 to 12:1, more preferably about 9:1. The chlorination reaction is a photochemical reaction and is carried out by dissolving the chlorine in the hydrocarbon and then exposing the resulting mixture or solution to ultraviolet light under time, temperature, and pressure conditions within the ranges set forth above.

It is to be understood that the invention is not limited to employing photochemical halogenation in the halogenation step. Haloalkanes prepared by any other suitable halogenation method such as thermal and catalytic methods can be employed in the practice of the invention. Halogenating agents in addition to those mentioned above which can be employed include sulfuryl chloride, thionyl chloride, and others. Halogenation catalysts which can be employed include ferric chloride, antimony chloride, sulfur chloride, iodoform, benzoyl peroxide and others. It should also be understood that it is within the scope of the invention to introduce pure or substantially pure halohydrocarbons from any source into the system via conduit 15, instead of or in addition to the halohydrocarbons from conduit 13.

A mixture of halogenated and nonhalogenated hydrocarbons is withdrawn from halogenation zone 11 via conduit 13 and introduced into alkylation zone 14. A suitable alkylation catalyst, such as aluminum chloride and/or aluminum chloride-hydrocarbon complex is introduced into alkylation zone 14 via conduit 16. A suitable alkylatable hydrocarbon is introduced into zone 14 via conduit 17. The process is applicable to the alkylation of benzene, toluene, xylene, and the like and is particularly applicable to the alkylation of benzene (the preferred aromatic hydrocarbon) with the halogenated n-paraffinic and isoparaffinic hydrocarbons containing from 10 to 15 carbon atoms. In some instances high aromatic content naphtha fractions boiling within the range of from about 175 to about 300° F., such as can be obtained from thermally cracked naphthas, can be employed as a source of alkylatable aromatic hydrocarbon. A particularly desirable catalyst is the complex of hydrocarbon with aluminum chloride. In addition to the catalyst it is desirable that the corresponding hydrogen halide be present in the reaction zone since this material maintains catalyst activity at a high level. The reaction rate and the conversion of the hydrocarbon feed is dependent on the amount of aluminum chloride in the aluminum chloride-hydrocarbon complex. However, the quantity of aluminum chloride in the complex can be varied over wide ranges to provide a corresponding range of feed reactant conversion. While the over-all activity of the catalyst is established by the aluminum chloride content, as stated, the presence of hydrogen chloride is required to provide a high activity. Usually the quantity of hydrogen chloride present is between about 0.5 and about 6 weight percent of the feed with about 2 to 4 weight percent being preferred. It is usually not necessary to add additional hydrogen chloride because the hydrocarbon charge will contain HCl liberated in the previous chlorination step. Also, HCl is liberated in the alkylation reaction.

The aluminum chloride-hydrocarbon complex catalyst can be originally prepared by mixing aluminum chloride and kerosene in a weight ratio of about 8:5. During operation of the process, the original complex catalyst is replaced with complex catalyst formed in the process. The heat of hydrolysis of the catalyst is usually in the range 150–250, more usually in the order of about 200, calories per gram. Catalyst having higher heats of hydrolysis, e.g., 300–325 calories per gram, can also be used with good results. The viscosity of the catalyst is usually in the order of 8 to 16, more generally in the order of 10 to 12 centipoises at 100° F.

The conditions employed in alkylation zone 14 will depend upon the catalyst employed, the aromatic hydrocarbon to be alkylated, and the boiling points of the haloalkanes. As will be understood by those skilled in the art, said conditions are interrelated. When employing the above-described aluminum chloride catalysts, the alkylation will generally be carried out at a temperature within the range of from 50 to 110° F. with a pressure sufficient to maintain liquid phase conditions and to prevent vaporization of catalyst. When operating in a continuous system, flow rates of reactants should be maintained such that the residence or contact time in the contactor or reaction zone is within the range of from about 10 minutes to about 30 minutes, preferably from about 10 to about 20 minutes.

The ratio of the total reactants feed to the reactor or alkylation zone, i.e., the sum of the aromatic hydrocarbon plus the mixture of haloalkanes, to the aluminum chloride catalyst will usually be within the range of from about 1:5 to 2:1, preferably 1:1, on a volume basis. The mol ratio of the aromatic hydrocarbon to the haloalkanes entering the alkylation zone should be such as to furnish at least one mol of aromatic hydrocarbon, e.g., benzene, per gram atom of halogen on the haloalkanes. It is preferred to operate with an excess of aromatic hydrocarbon. Thus, the mol ratio of the aromatic hydrocarbon to the haloalkanes can vary over a wide range but will generally be maintained within the range of from about 2:1 to 30:1, preferably from 8:1 to 15:1.

It will be understood that alkylation zone 14 includes, in addition to a suitable contactor or reactor for carrying out the alkylation reaction, a separation vessel or zone wherein a hydrocarbon phase is separated from the catalyst phase which is returned to said contactor or reactor. Said hydrocarbon phase is withdrawn from zone 14 via conduit 21 and passed via conduit 22 into the lower portion of coalescer 23 for removal of entrained aluminum chloride catalyst. Said coalescer 23 can comprise any suitable type of vessel and conveniently comprises an upright tower containing a bed of any suitable contacting material such as porcelain saddles, Raschig rings, gravel, anthracite coal, etc. Coalesced and separated catalyst is withdrawn from the bottom of vessel 23 via conduit 24. Hydrocarbon phase, now substantially free of entrained catalyst but still containing dissolved aluminum chloride catalyst is withdrawn from said coalescer via conduit 26. In some instances where the amount of entrained catalyst in the hydrocarbon stream in conduit 21 is negligibly small, said hydrocarbon stream can be passed around said coalescer via conduit 28 and introduced into said conduit 27.

The hydrocarbon stream in conduit 27, together with an aqueous hydrogen chloride-mineral acid solution from conduit 31, is passed via conduit 32 into pump 33 where said streams of hydrocarbon and acid are mixed and then introduced into contacting tower 34 wherein the mixture separates into a hydrocarbon phase 36 and an aqueous acid phase 37. In operation, said aqueous acid phase is withdrawn via conduits 29 and 31 and recirculated as described.

Said contacting tower 34 preferably comprises a cylindrical vessel. A first tray 38 is positioned in the approximately upper one-half portion of said tower and is sealed at its periphery to the inner wall of said tower. A plurality of openings 39 are provided in said tray. A downcomer tube 41 is positioned in one of said openings and sealed around its outer wall to the periphery of said opening. Said downcomer tube extends above said tray 38 a distance sufficient to maintain a substantial depth of liquid on said tray and extends below said tray into the lower portion of said tower. In practice, said liquid depth can be from 0.1 to 0.25 the length of said tower. A baffle tube 42 is mounted around the upper end of said downcomer tube. The upper end of said baffle tube extends a small distance above the upper end of said downcomer tube and the lower end of said baffle tube terminates adjacent and above said tray 38. A plurality of riser tubes 43, corresponding in number to the remainder of said openings in said tray 38, extend upwardly from each of said openings. Each one of said riser tubes is sealed around its outer wall into a said opening in said tray 38 around the periphery of said opening. Said riser tubes extend above said tray 38 substantially the same distance as said downcomer tube 41. A plurality of bubble caps 44 corresponding in number to said riser tubes, are mounted over said riser tubes above the upper open ends thereof and extend downward around said riser tubes to a point adjacent and above said tray 28. Contact packing material such as Burl saddles, Raschig rings, etc. fills the space around said bubble caps and said baffle to form a first contact bed 40. A perforated second tray means 46 is positioned within said tower above said first tray 38 and is sealed at its periphery to the inner wall of said tower. A screen 47 can be employed to cover the perforations in said second tray 46 if necessary, depending upon the size of said perforations. A second bed 48 of contact packing, such as Burl saddles, Raschig rings, glass wool, etc., is supported on said tray means 46 and serves as a coalescing bed. A first inlet conduit means 49 is connected to said tower adjacent the lower end thereof. A second inlet conduit means 51 is connected to said tower adjacent the top of said first bed of contacting material 40. A third conduit inlet means 52 is connected to said tower intermediate said first and second conduit inlet means and below the bottom of said first tray 38. A first conduit outlet means 53 is connected to the upper end of said tower and a second conduit outlet means 29 is connected to the lower end of said tower.

In the operation of said tower 34 the hydrocarbon stream in conduit 27 is mixed in conduit 32 and pump 33 with aqueous hydrogen chloride-mineral acid solution withdrawn from said tower via conduits 29 and 31, as described above. Make-up mineral acid, such as phosphoric acid, can be added to said tower through inlet conduit means 49. Upon continued introduction of said mixture into said tower, hydrocarbon phase 36 flows upwardly through said riser tubes 43, downwardly between said riser tubes and said bubble caps 44, and then upwardly through packing material 40. A level of aqueous hydrogen chloride solution is maintained on said tray 38 and in said packing bed 40. Hydrogen chloride solution, or water, as required, is introduced into said tower via inlet conduit means 51. The hydrogen chloride solution thus maintained on said tray 38 serves to wash or scrub out any remaining traces of mineral acid entrained or dissolved in the hydrocarbon stream. Said hydrocarbon stream continues to flow upwardly through bed 48 which serves as a coalescing zone to remove entrained aqueous hydrogen chloride solution.

The hydrocarbon stream, now essentially or completely free of aluminum chloride, is withdrawn from said tower 34 via conduit 53 and introduced into benzene tower 54 adjacent the top thereof. Said tower 54 operates as a benzene and hydrogen chloride stripper tower. Since the hydrocarbon stream introduced thereinto is now essentially free of dissolved aluminum chloride, a much higher temperature can be tolerated in the reboiler portion of said tower 54. This permits withdrawal of a sidestream of essentially pure benzene vapors (uncontaminated with HCl) from the side of tower 54 via conduit 56 and condenser 57. Operating conditions on said tower 54 will generally be as follows: top of tower, 70 to 250, preferably 70 to 150° F.; bottom of tower, 350 to 600° F.; and pressure, 15 to 50 p.s.i.a. When the feed to tower 54 contains aluminum chloride (as in the absence of this invention) the bottom temperature of tower 54 cannot exceed 300° F. without causing excessive deposition and corrosion problems. Even more important, in many instances the conversion product, e.g., the alkylate in the illustrated process, cannot be heated to temperature in excess of 300° F. in the presence of aluminum chloride catalyst without causing decomposition or degradation of said alkylate. At such temperatures benzene cannot be effectively and efficiently removed from the alkylate in a single tower along with the hydrogen chloride. Two towers are required, one for hydrogen chloride removal and another for benzene removal.

The condensed benzene from condenser 57 is passed via conduit 58 into conduit 17 for recycle to alkylation zone 14. In practice, it will generally be convenient to provide a surge tank (not shown) downstream of said condenser 57, as will be understood by those skilled in the art. Hydrogen chloride gas, together with a relatively small amount of benzene vapors, is withdrawn overhead from said tower 54 via conduit 59, condenser 61 and introduced via conduit 62 into the lower portion of benzene absorber 63 which can comprise any suitable type of vessel containing a bed of suitable contacting material, such as Burl saddles, Raschig rings, etc. A stream of a suitable absorption medium, such as normal paraffins, from any suitable source is introduced via conduits 64 and 66 into the upper portion of absorber 63. Said absorber 63 is preferably operated "cold," e.g., at a temperature within the range of from 40 to 80° F. If necessary, it is within the scope of the invention to supply sufficient refrigeration to condenser 61 and cooler 74 to attain these temperatures. Pressure in said absorber 63 is not critical and is usually within the range of from 15 to 45 p.s.i.a. Hydrogen chloride gas passes upwardly through the bed of contact material in said absorber 63 and is withdrawn therefrom via conduit 67 and passed to compression as a product of the process. If necessary or desirable said hydrogen chloride gas in conduit 67 can be dried by any suitable means prior to or after compression. Also, in those conversion processes wherein hydrogen chloride is not produced in the conversion zone, a portion or all of the hydrogen chloride in said conduit 67 can be returned to said conversion zone as the hydrogen chloride promoter for the catalyst utilized therein. Benzene and absorption medium are withdrawn from the bottom of absorber 63 via conduit 68 and passed into conduit 51 for introduction into tower 34.

Alkylate, now free of benzene and dissolved hydrogen chloride, is withdrawn from the bottom of tower 54 via conduit 69 and introduced into fractionation zone 71. Said fractionation zone 71 can comprise any suitable number of conventional fractionators for making the desired separation. An overhead fraction comprising nonhalogenated hydrocarbons is withdrawn from said fractionation zone 71 via conduit 72 for recycle to said halogenation zone 11. If desired, a portion of said nonhalogenated hydrocarbons can be passed via conduit 73 into conduit 66 as the absorption medium for utilization in absorber 63. Usually, a light alkylate stream comprising nonhalogenated paraffins and product alkylate is withdrawn via conduit 74 to suitable storage or other use. A product alkylate stream withdrawn via conduit 75 is comprised principally of monoalkyl aromatic compounds and is the detergent grade alkylate product of the process. A bottoms or heavy alkylate stream withdrawn from fractionation zone 71 via conduit 76 comprises a high molecular weight, high density material and can be utilized as a high density fuel stock.

The volume of the aqueous hydrogen chloride-mineral acid solution used in contacting the aluminum chloride containing hydrocarbon stream in the first contacting step of the process of the invention can vary over a relatively wide range. The actual volume employed will depend somewhat upon the aluminum chloride concentration in said hydrocarbon stream and the desired degree of aluminum chloride removal therefrom. Thus, the invention should not be limited to employing any particular amount of said aqueous hydrogen chloride-mineral acid solution for contacting the hydrocarbon stream to be treated. Generally speaking, the volume ratio of said aqueous hydrogen chloride-mineral acid solution to hydrocarbon stream to be treated will be within the range of from 2:1 to 1:6, preferably 1:1 to 1:4. A more preferred volume ratio for some operations is 1:2, i.e., one volume of said acid solution to two volumes of hydrocarbon solution to be treated.

The concentration of hydrogen chloride in the aqueous hydrogen chloride-mineral acid treating solution will depend somewhat upon the amount of hydrogen chloride dissolved in the hydrocarbon stream to be treated since the concentration of HCl in these two streams tends to come to equilibrium, particularly in a continuous treating system such as that illustrated in the drawing. Since in most instances it is desirable in the practice of the invention to remove aluminum chloride but not remove dissolved hydrogen chloride from the hydrocarbon stream being treated, the concentration of hydrogen chloride in said aqueous hydrogen chloride-mineral acid treating solution will in most instances be such that no dissolved hydrogen chloride will be removed from the hydrocarbon stream. Generally speaking, the concentration of hydrogen chloride in said aqueous treating solution can be in the range of from 5 to 50, preferably 25 to 45, weight percent. For example, when the hydrocarbon stream being treated contains about 1.5 weight percent dissolved hydrogen chloride, a preferred concentration of hydrogen chloride in said aqueous treating solution will be about 30 to 45 weight percent.

The mineral acid used in said aqueous hydrogen chloride-mineral acid treating solution can be either phosphoric acid, sulfuric acid, or mixtures of said acids. Phosphoric acid is presently preferred. The concentration of mineral acid in said treating solution can vary over a wide range but in all cases will be sufficient to prevent the formation of a precipitate of aluminum chloride. The concentration of said mineral acid in said treating solution can be in the range of from 5 to 45 weight percent but is preferably within the range of from 15 to 25 weight percent since the solubility of aluminum chloride is not appreciably increased at higher concentrations.

During operation the concentration of aluminum chloride will build up in the circulating hydrogen chloride-mineral acid treating solution. Aluminum chloride is removed from the system by withdrawing a portion of the circulating solution via conduit 77 for discard or for recovery of the chemicals contained therein, as desired. The amount withdrawn via said conduit 77 will be an amount sufficient to maintain the concentration of aluminum chloride in the circulating treating solution within desirable limits, less than 15, preferably 6 to 12, weight percent. Make-up mineral acid is added via conduit 49 as previously described. Make-up aqueous hydrogen chloride solution for the circulating treating solution 37 is supplied through downcomer tube 41.

The concentration of hydrogen chloride in the aqueous hydrogen chloride treating solution used in the second contacting step of the process of the invention will also depend somewhat upon the amount of hydrogen chloride dissolved in the hydrocarbon stream to be treated. The concentration of hydrogen chloride in this treating solution can also be within the range of from 5 to 50, preferably 25 to 45 weight percent. The concentration of hydrogen chloride in this treating solution and in the hydrocarbon being treated also tends to come to equilibrium as discussed above. Make-up water or hydrogen chloride solution can be introduced into the system via conduit 51 in an amount which, together with any water which may be present in conduit 63, is sufficient to supply the volume withdrawn from the bottom of the tower via conduits 29 and 77. In the practice of the invention the treating or contacting in said second contacting step will usually be in the range of from 3 to 50 volumes of hydrocarbon per volume of hydrogen chloride per hour.

The invention should not be limited to any particular operating conditions with respect to temperature and pressure in the two contacting steps thereof. The hydrocarbon stream to be treated with the aqueous hydrogen chloride-mineral acid treating solution in the first contacting step of the invention can be conveniently treated at a temperature within the range of from 50 to 135, preferably 70 to 95° F. Substantially the same temperatures are maintained throughout said contacting tower 34. The pressure in said contacting tower 34 will be determined by the temperature and the concentration of hydrogen chloride in the two aqueous treating solutions utilized therein. Generally speaking said pressure will be sufficient to maintain the hydrocarbon and treating solutions in liquid phase, i.e., slightly above the bubble point pressure, and will usually be within the range of from 25 to 50 p.s.i.a. It is, however, within the scope of the invention to employ pressures outside of said range.

The following examples will serve to further illustrate the invention.

Example I

A series of runs was carried out to determine the equilibrium solubilities of hydrogen chloride and phosphoric acid in certain hydrocarbons. A mixture of hydrocarbons containing 33.3 weight percent dodecane and 66.7 weight percent benzene was prepared. Next, a series of aqueous acid solutions having the approximate hydrogen chloride and phosphoric acid concentrations indicated in Table I below was prepared. In each run one volume of acid solution was vigorously agitated with one volume of said hydrocarbon mixture in a separatory funnel. After mixing, the two phases where then allowed to settle, were separated, and each phase was then analyzed for hydrogen chloride and phosphoric acid content. The results of said analyses are set forth in Table I below.

TABLE I.—EQUILIBRIUM SOLUBILITIES OF HYDROGEN CHLORIDE AND PHOSPHORIC ACID IN SYNTHETIC ALKYLATE

| Run Number | Weight Percent HCl in— | | Weight Percent $H_3PO_4$ in— | | $H_2O$ in HC[1] phase (p.p.m.) |
|---|---|---|---|---|---|
| | $H_2O$ phase | HC[1] phase | $H_2O$ phase | HC phase | |
| 1 | 32.09 | 0.17 | 0.0 | 0.0 | 115 |
| 2 | 29.88 | .15 | 5.89 | 0.0 | 130 |
| 3 | 27.80 | .13 | 12.61 | 0.0 | |
| 4 | 24.43 | .10 | 20.09 | 0.0 | |
| 5 | 19.13 | .09 | 33.81 | 0.0 | |
| 6 | 15.93 | .07 | 43.34 | 0.0 | |
| 7 | 13.28 | .06 | 49.28 | 0.0 | |

[1] Hydrocarbon.

The data given in Table I above show that phosphoric acid is essentially insoluble in the hydrocarbon phase.

Example II

In another series of runs the solubility of anhydrous aluminum chloride in acid solutions having varying concentrations of hydrogen chloride and phosphoric acid was determined. In each run an acid solution having the approximate concentrations of hydrogen chloride and phosphoric acid indicated in Table II below was prepared. A sample of each acid solution was then shaken vigorously in a separatory funnel with an excess of anhydrous aluminum chloride crystals. The excess of aluminum chloride crystals was then removed from the mixture by filtration and the filtrate was analyzed for hydrogen chloride, phosphoric acid, and aluminum chloride contents. The results of said analyses are set forth in Table II below.

TABLE II.—SOLUBILITY OF ANHYDROUS ALUMINUM CHLORIDE IN ACID MIXTURE

| Run Number | HCl Concentration, Weight Percent | $H_3PO_4$ Concentration, Weight Percent | $AlCl_3$ Concentration, Weight Percent |
|---|---|---|---|
| 1 | 33.43 | 0.00 | 0.346 |
| 2 | 16.24 | 6.77 | 5.45 |
| 3 | 7.25 | 18.67 | 18.30 |
| 4 | 0.00 | 32.19 | 21.28 |

The data in Table II above show that the solubility of aluminum chloride does not increase significantly with concentrations of phosphoric acid of more than about 18 to 20 weight percent.

Example III

Referring to the drawing, a mixture of $C_{10}$ to $C_{13}$ paraffinic hydrocarbons is chlorinated in halogenation zone 11 in conventional manner in accordance with the above description of the operation of said halogenation zone. The haloalkanes product is passed through conduit 13 to alkylation zone 14. In said alkylation zone said haloalkanes are used to alkylate benzene in conventional manner, as described above, employing aluminum chloride catalyst and hydrogen chloride promoter therefor.

The hydrocarbon phase effluent from alkylation zone 14 is passed through coalescing zone 23 for removal of entrained aluminum chloride catalyst. Effluent from said coalescer is passed through conduit 27, mixed in conduit 32 and pump 33 with an approximately equal volume of a concentrated aqueous hydrogen chloride solution (from conduit 31) which also contains phosphoric acid, and the resulting mixture is introduced into the lower portion of vessel 34 wherein a separation between the aqueous and hydrocarbon phases occurs. Hydrocarbon phase 36 passes upwardly through contact bed 40 where it contacts a concentrated aqueous solution of hydrogen chloride, maintained on tray 38, in a volume ratio of about 16 volumes of hydrocarbon to one volume of hydrogen chloride solution. Treated hydrocarbon phase, essentially free of aluminum chloride (less than 5 parts per million by weight), is withdrawn from vessel 34 via conduit 53 and processed in accordance with the remainder of said drawing for the recovery of a detergent grade alkylate.

Stream compositions and flow rates for the above-described operation are set forth in Table III below.

TABLE III

| | Coalescer Effluent | Treating Solution | Water | $H_3PO_4$ | Recycle to Treater | Treater Effluent | Stripper Overhead | Stripper Side-stream | Stripper Bottoms | Paraffins to Absorber | Absorber Overhead |
|---|---|---|---|---|---|---|---|---|---|---|---|
| Stream Number | 27 | 31 | 51 | 49 | 68 | 53 | 59 | 56 | 69 | 66 | 67 |
| Composition, mols/hr.: | | | | | | | | | | | |
| Hydrogen chloride | 22.2 | 0.9 | | | 0.4 | 21.5 | 21.5 | | | | 21.1 |
| Benzene | 235.0 | | | | 5.0 | 240.0 | 5.0 | 235.0 | | | |
| Decane | 8.4 | | | | 0.4 | 8.8 | | 0.4 | 8.4 | 0.4 | |
| Undecane | 42.1 | | | | 2.0 | 44.1 | | 1.1 | 43.0 | 2.0 | |
| Dodecane | 36.4 | | | | 1.8 | 38.2 | | 0.4 | 37.8 | 1.8 | |
| Tridecane | 17.1 | | | | 0.8 | 17.9 | | 0.1 | 17.8 | 0.8 | |
| Phenylalkanes | 19.0 | | | | | 19.0 | | | 19.0 | | |
| Phosphoric acid | | 0.2 | | 0.2 | | | | | | | |
| Water | | 3.0 | 3.0 | | | 0.2 | 0.2 | | | | |
| Aluminum chloride | <0.1 | <0.1 | | | | (1) | | | | | |
| Total, mols/hr | 380.3 | ² 4.2 | 3.0 | 0.2 | 10.6 | 390.6 | 26.7 | 237.0 | 126.0 | 5.0 | 21.1 |

¹ Essentially zero, i.e., less than 5 p.p.m.
² Discard through conduit 77.

While the invention has been described above with particular reference to a conversion process wherein aluminum chloride is employed as a catalyst in the alkylation of benzenes with alkyl halides, the invention is not so limited. The invention is applicable to removing aluminum chloride from hydrocarbon streams in any conversion process wherein aluminum chloride is employed as the catalyst and the hydrocarbon streams from said conversion contain aluminum chloride. The invention is also applicable to removing aluminum chloride from hydrocarbon streams other than hydrocarbon streams from hydrocarbon conversion processes. Thus, the invention is applicable to the removal of aluminum chloride from hydrocarbon streams containing the same from any source, regardless of whether or not the aluminum chloride has been employed as a catalyst.

Any suitable material can be employed for fabricating the various items of apparatus illustrated in the drawing and other apparatus which may be employed in carrying out the invention. In several instances it will be necessary that said apparatus be fabricated from acid-resistant materials. For example, treating vessel 34 can be a glass-lined vessel provided with acid-resistant internal structures fabricated from suitable acid-resistant alloys such as Hastelloy, etc. Likewise, the packing material in bed 40 will be made of ceramic or carbon. Similarly, pump 33 will be designed and fabricated for acid service. Many materials are available for acid service and those skilled in the art will have no difficulties in determining where such materials should be employed in view of this disclosure.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:
1. A process for removing aluminum chloride from a hydrocarbon stream containing the same, which process comprises the steps of: contacting said stream with an aqueous solution of hydrogen chloride which also contains a minor but effective amount of a mineral acid sufficient to prevent the formation of a precipitate of aluminum chloride in said solution, said mineral acid being selected from the group consisting of phosphoric acid, sulfuric acid, and mixtures thereof; and then contacting said thus treated hydrocarbon stream with an aqueous solution of hydrogen chloride.

2. The process of claim 1 wherein said aqueous solution of hydrogen chloride and mineral acid contains from 5 to 50 weight percent of hydrogen chloride and from 5 to 45 weight percent of mineral acid.

3. The process of claim 1 wherein said aqueous solution of hydrogen chloride and mineral acid contains from 25 to 45 weight percent of hydrogen chloride and from 15 to 25 weight percent of phosphoric acid.

4. A process for removing aluminum chloride from a hydrocarbon stream containing the same, which process comprises the steps of: mixing said stream with an aqueous solution of hydrogen chloride which also contains a minor but effective amount of a mineral acid sufficient to prevent the formation of a precipitate of aluminum chloride in said solution, said mineral acid being selected from the group consisting of phosphoric acid, sulfuric acid, and mixtures thereof; passing said mixture of hydrocarbon and aqueous solution to a settling zone wherein a phase separation occurs; passing hydrocarbon phase from said settling zone to a contacting zone and therein contacting said hydrocarbon phase with an aqueous solution of hydrogen chloride; and recovering treated hydrocarbon phase which is essentially free of aluminum chloride.

5. A process for removing aluminum chloride from a hydrocarbon stream containing the same, which process comprises: mixing said stream with a concentrated aqueous solution of hydrogen chloride which also contains a minor but effective amount of a mineral acid sufficient to prevent the formation of a precipitate of aluminum chloride in said solution, said mineral acid being selected from the group consisting of phosphoric acid, sulfuric acid, and mixtures thereof; passing the resulting mixture to a settling zone wherein a phase separation between said hydrocarbon stream and said aqueous solution occurs; passing hydrocarbon phase from said settling zone through a contacting zone; in said contacting zone, contacting said hydrocarbon phase with a concentrated aqueous solution of hydrogen chloride; passing said hydrocarbon phase from said contacting zone through a coalescing zone; and recovering treated hydrocarbon phase which is essentially free of aluminum chloride from said coalescing zone.

6. The process of claim 5 wherein said aqueous solution of hydrogen chloride and mineral acid contains from 5 to 50 weight percent of hydrogen chloride and from 5 to 45 weight percent of mineral acid.

7. The process of claim 5 wherein said aqueous solution of hydrogen chloride and mineral acid contains from 25 to 45 weight percent of hydrogen chloride and from 15 to 25 weight percent of phosphoric acid.

8. In a hydrocarbon conversion process wherein conversion is effected in the presence of an aluminum chloride catalyst and hydrogen chloride promoter therefor and wherein the hydrocarbon effluent from said conversion zone contains a small but appreciable amount of said catalyst and said promoter, the improvement comprising:

contacting said hydrocarbon effluent with an aqueous solution of hydrogen chloride which also contains a small but effective amount of a mineral acid sufficient to prevent the formation of a precipitate of aluminum chloride in said solution, said mineral acid being selected from the group consisting of phosphoric acid, sulfuric acid, and mixtures thereof; then contacting said thus treated hydrocarbon effluent with an aqueous solution of hydrogen chloride; and recovering a treated hydrocarbon effluent which is essentially free of aluminum chloride.

9. In a process for the production of a detergent grade alkylate wherein n-paraffinic and isoparaffinic hydrocarbons wherein the number of carbon atoms per molecule is within the range of from 10 to 15 are chlorinated with chlorine in a chlorination zone under chlorination conditions to produce a mixture of chlorinated and nonchlorinated hydrocarbons, benzene is alkylated with said mixture of hydrocarbons in an alkylation zone in the presence of an aluminum chloride catalyst and a hydrogen chloride promoter under alkylation conditions to form an alkylate stream which contains a small but appreciable amount of said catalyst and said promoter, the improvement comprising: mixing said alkylate stream with an aqueous acid solution containing from 25 to 50 weight percent of hydrogen chloride and from 15 to 25 weight percent of a mineral acid selected from the group consisting of phosphoric acid, sulfuric acid, and mixtures thereof; passing the resulting mixture of acid solution and alkylate to a settling zone wherein phase separation into an aqueous phase and an alkylate phase occurs; passing said alkylate phase to a contacting zone; in said contacting zone, contacting said alkylate phase with a concentrated aqueous solution of hydrogen chloride containing from 25 to 45 weight percent of hydrogen chloride; and recovering a treated alkylate which is essentially free of aluminum chloride.

References Cited
UNITED STATES PATENTS

| | | | |
|---|---|---|---|
| 2,368,309 | 1/1945 | Latchum et al. | 260—683.74 X |
| 2,396,859 | 3/1946 | Laychum | 260—683.74 X |
| 2,404,923 | 7/1946 | Patterson | 260—683.74 X |
| 2,806,875 | 9/1957 | Geiser | 260—671 X |
| 2,875,257 | 2/1959 | Thompson | 260—671 X |

DELBERT E. GANTZ, *Primary Examiner.*

C. R. DAVIS, *Assistant Examiner.*